W. A. NORMAN.
TRUCK.
APPLICATION FILED NOV. 20, 1915.
1,207,433.
Patented Dec. 5, 1916.
2 SHEETS—SHEET 1.
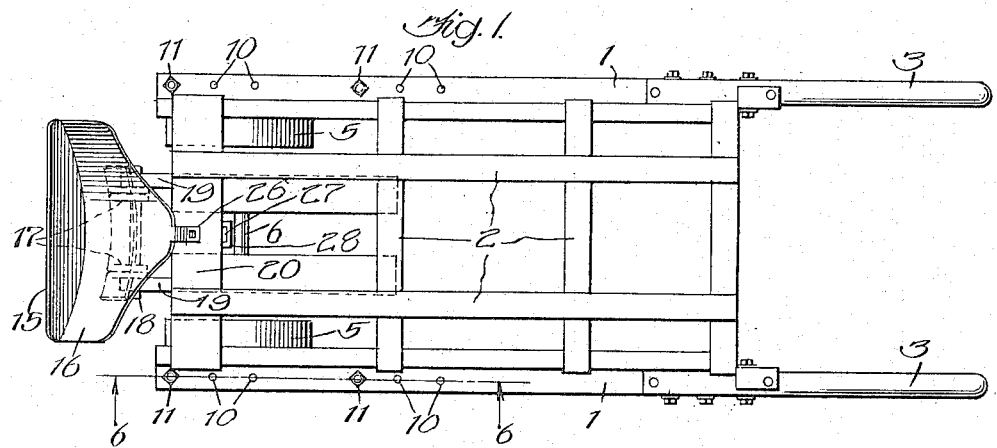
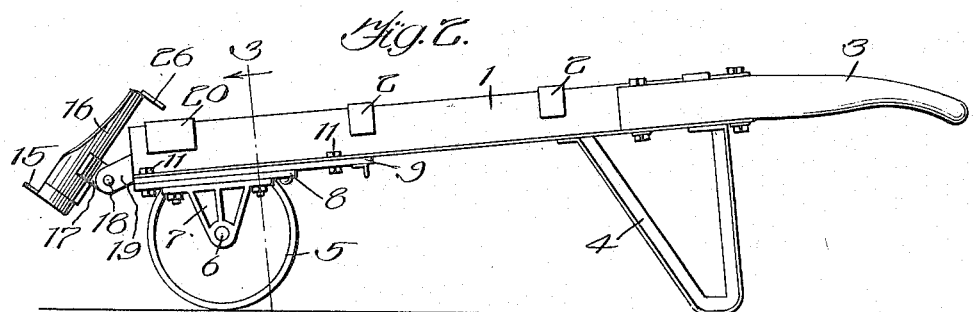
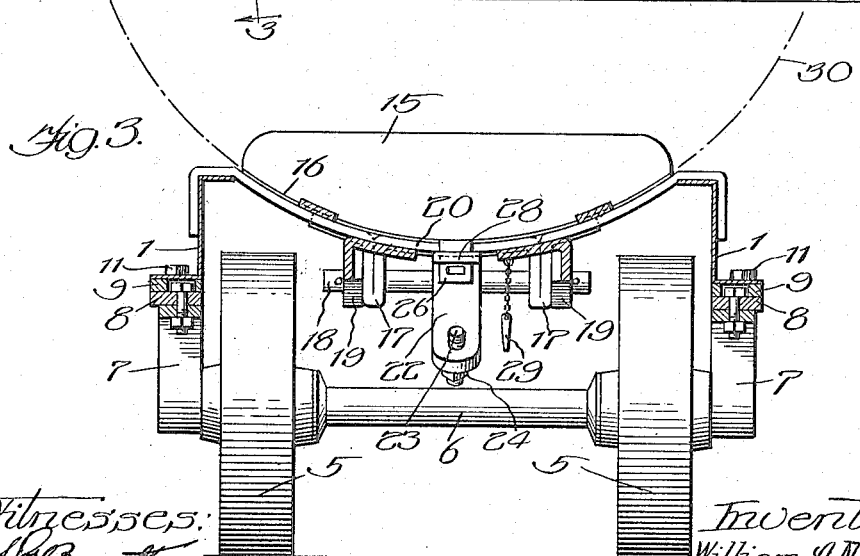
Witnesses:
Inventor:
William A. Norman
By Cheever & Cox, Attys.

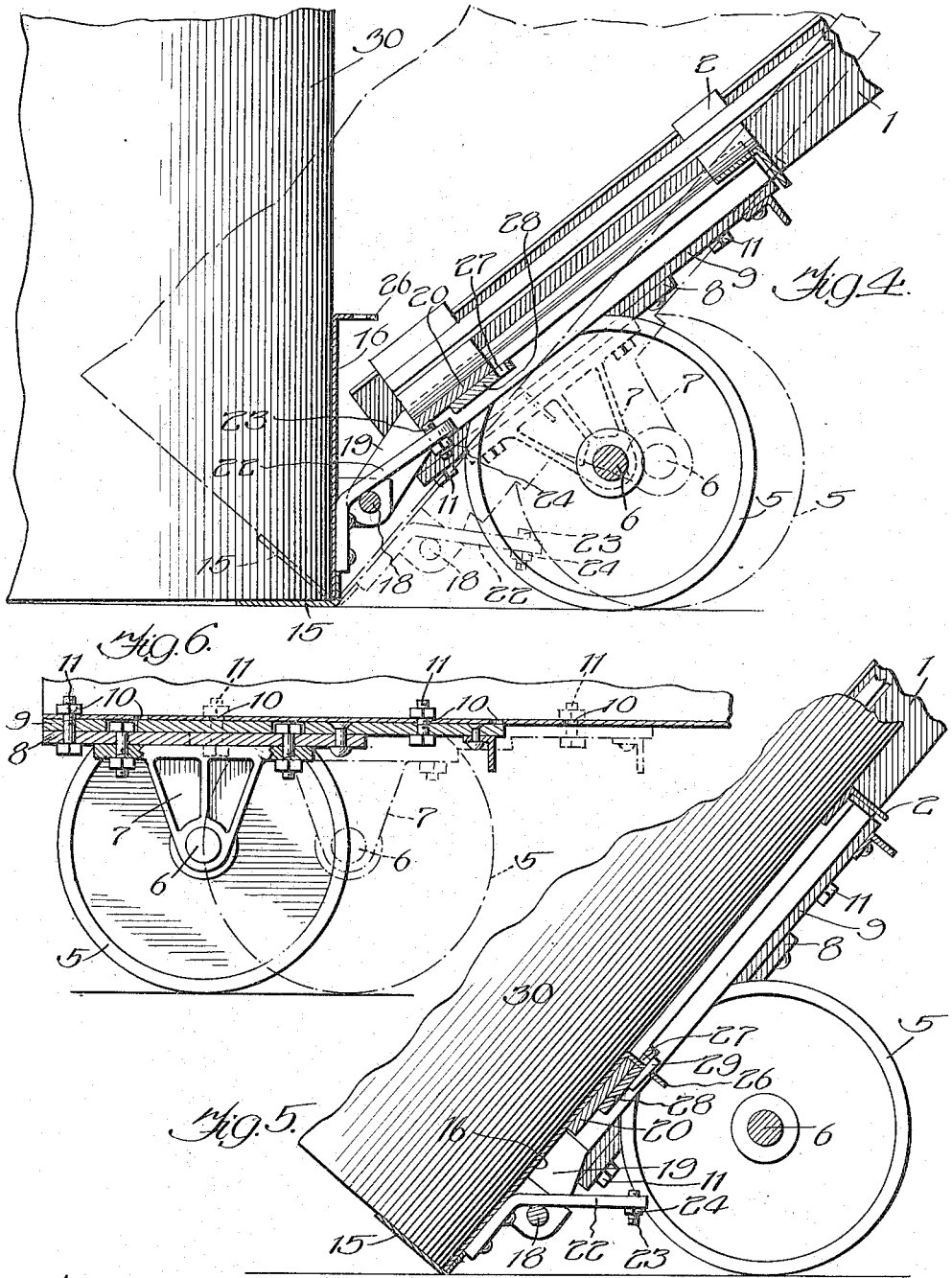

UNITED STATES PATENT OFFICE.

WILLIAM A. NORMAN, OF CHICAGO, ILLINOIS.

TRUCK.

1,207,433. Specification of Letters Patent. Patented Dec. 5, 1916.

Application filed November 20, 1915. Serial No. 62,460.

*To all whom it may concern:*

Be it known that I, WILLIAM A. NORMAN, a citizen of the United States, residing at Chicago, in the county of Cook and State of Illinois, have invented a certain new and useful Improvement in Trucks, of which the following is a specification.

My invention relates to hand trucks for transporting paper rolls, packing-cases and other heavy objects.

The object of my invention is particularly well illustrated in connection with the handling of roll paper and I have chosen to illustrate the invention in connection with a truck especially designed for that purpose. It will be understood by those familiar with the handling of roll paper, especially of the larger rolls used by newspapers and periodicals, that considerable difficulty is experienced in handling them properly. They are very heavy and yet the paper in them is tender and will crush at the edges if the roll is turned up on its edge. In trucking the rolls into and out of freight cars and into and out of the pressroom, the weight and form of the roll makes it difficult to handle. With an ordinary truck it is necessary in loading a roll for one man to go to the handles of the truck, the truck wheels being first scotched so as to prevent the truck from rolling backward. It then requires one, and frequently two men to load the roll and assist the trucker to lower the handles and bring the load to an approximately balanced position.

The general object of my invention is to facilitate these operations, prevent damage to the object which is being handled and to reduce the amount of labor and lifting required. I accomplish this, generally speaking, by forming a cradle at the forward end of the truck and pivoting it to the truck at a point in front of the main axle. I facilitate the loading also by providing a stop for limiting the extent to which the cradle may be lowered. In the form here shown this stop is capable of adjustment. According to the design illustrated, the cradle tends to overbalance and swing to lowered position, the advantage being hereinafter explained. In my present form I have also provided for overcoming this tendency to overbalance and have provided locking means for holding the cradle rigid when it is desired to employ the truck for other purposes. I have also provided means whereby the truck wheels may be adjusted longitudinally of the truck to permit the balancing of the various sizes of rolls or other freight to be handled.

I accomplish my objects by the mechanism illustrated in the accompanying drawings, in which—

Figure 1 is a plan view of the truck. Fig. 2 is a side elevation thereof. Fig. 3 is a cross section on a larger scale taken on the line 3—3, Fig. 2, the cradle being shown in the position it will occupy when the truck is loaded. Fig. 4 is a side elevation partly in longitudinal section, showing the parts in the process of being adjusted to the roll. Fig. 5 is similar to Fig. 4, but shows the roll loaded upon the truck. Fig. 6 is a detail showing the adjustability of the truck wheels longitudinally of the body of the truck.

Similar numerals refer to similar parts throughout the several views.

The body of the truck consists of a suitable arrangement of side bars 1, and supplementary bars forming a platform 2. The side bars are here shown as two bars and are provided with arms 3 and legs 4. So far as these parts are concerned any suitable design may be employed.

The wheels 5 are mounted upon an axle 6 journaled in brackets 7. These brackets are adjustable longitudinally of the truck in the manner best shown in Figs. 3 and 6. Said brackets are fastened to plates 8 which are in turn fastened to plates 9 which overlie them. The lower flanges of the side bars 1 have a series of apertures 10 through which pass bolts 11 by which the axle brackets and their superposed plates may be fastened at any desired position lengthwise of the truck body. All that is necessary in order to shift the position of the axle is to remove the bolts 11 and then replace them through the proper apertures 10 in the side bars. This lengthwise adjustability of the truck wheels is of great advantage for it enables the trucker to accommodate the truck to the various lengths of the objects he is handling. It enables him to so locate the axle as to bring it approximately beneath the center of gravity of the load, and also to vary the angle at which the truck body will come to rest when first loaded and in the state shown in Fig. 5.

At the forward end of the truck is a shoe which in the present instance is especially designed for the handling of roll paper, although it will be understood that the design of the shoe may be varied to handle packing boxes or other objects which are not cylindrical. In the design illustrated, the shoe has a sole plate 15 and a cylindrically curved back wall 16. Lugs 17 are riveted or otherwise rigidly secured to the back wall 16 and these are pivoted by means of a hinge pin 18 to lugs 19 rigidly fastened to the cross bar 20 which forms part of the body of the truck. The parts are so arranged and distributed that normally the center of gravity of the shoe and parts attached thereto are beyond the center of the hinge pin 18, as a result of which the shoe is overbalanced and tends to drop down at the front edge. This movement of the shoe is limited by a stop or check which according to the present design consists of an arm 22 riveted or otherwise rigidly fastened to the back of the shoe and extending backward to a point where its rear end will contact the cross bar 20. By preference, a set screw 23 screws into the rear end of the check arm in position to engage said cross bar 20. This screw is held in position by a lock nut 24 and by adjusting the screw in the arm, the shoe may be permitted to drop a greater or less distance. For handling some classes of freight, it may be desirable to permanently hold the shoe in raised position. I accomplish this by forming an apertured lug 26 extending rearwardly from the back of the shoe and this passes through an aperture 27 in a plate 28 fastened to the plate 20. When the shoe is raised the lug 26 passes through the aperture 27 and may be held in this position by pin 29 shown in acting position in Fig. 5.

Operation: When a load is to be taken on, the parts are brought to the position shown in Fig. 4, the check screw 23 contacting the cross bar 20 and the sole plate 15 of the shoe resting upon the floor in which position it may be most readily inserted beneath the corner of the roll 30. It will be noted that under these conditions the axis of the shoe and parts rotating therewith (which may collectively be termed the "cradle") comes between the truck axle and the point where the sole plate 15 joins the upright back wall of the shoe. (This may be called the "corner" of the shoe.) Now when the parts are adjusted as shown in Fig. 4 with the roll in position, it will, under ordinary circumstances, be possible for the trucker to remove his hands from the truck handles and either assisted or unassisted tilt the roll over to the position shown in Fig. 5. During this tilting operation the shoe does not leave the floor, but simply rolls over upon its corner as an axis. Obviously such a tilting operation requires the minimum of effort on the part of the person or persons handling the freight because the weight of the roll as a whole is not lifted from the floor. During the tilting operation, the rotating of the cradle about this point on the floor forces the hinge pin 18 backward and downward a little way and simultaneously causes the truck wheels to rotate backward a slight distance, for example, to the position of the dotted lines shown in Fig. 4. During the tilting operation the truck body has automatically been rotated and shifted until it comes in line with the back of the shoe as shown in Fig. 5. When this operation has been accomplished the center of gravity of the load will come somewhere between the point of contact of the shoe on the floor and the point of contact of the truck wheels upon the floor, preferably very near to the latter point. Under these conditions the weight of the load will hold the truck safely in the position shown in Fig. 5 and consequently the freight handler is now free to leave everything and go around to the handles of the truck. Now as the center of gravity of the load is near the vertical line passing through the main axle, it does not require much exertion on the part of the trucker to lower the handles. In thus lowering the handles, however, he shifts the center of gravity to a point on the opposite side of the plane passing through the truck axle at right angles to the length of the truck; hence when he is wheeling the truck away, part of the weight of the load will be borne by him as with the ordinary truck.

From the foregoing analysis of the normal method of operation, it will be seen that my invention saves a large part of the energy usually necessary to handle heavy loads and under ordinary circumstances will dispense with services of one attendant, for with my truck it is possible for the one who will wheel the truck to leave the handles to themselves while the load is being placed. Another advantage is that it is unnecessary to block the wheels of the truck or scotch them, or for the operator to put his foot upon the truck axle to prevent backward movement when the load is being applied. In fact, with my truck, it would interfere with the action to block the wheels or otherwise prevent their moving backward. By adjusting the truck wheels longitudinally, it becomes possible for the truck to operate according to the principle above described, even though rolls or boxes of different sizes and lengths are to be handled.

Having thus described my invention what

I claim as new and desire to secure by Letters Patent, is:

1. A truck having a body provided with a cradle, pivotally mounted at the forward end, truck wheels, and means for varying the distance between the axis of the cradle and the axis of the truck wheels.

2. A truck having a body, a cradle having a sole plate and a back wall rising therefrom, a hinge connecting the cradle with the body whereby the cradle may be tilted about its corner as a center while resting upon the floor, truck wheels mounted upon an axis located behind the cradle hinge, and means for shifting the truck wheels longitudinally of the truck body to thereby increase or decrease the distance between the truck wheel axis and the said cradle corner or point where the sole plate joins the back wall of the cradle.

3. A truck having a body, truck wheels, mounted near the forward end thereof, a cradle pivoted to the truck body in advance of the axis of the wheels, a check arm for limiting the rotary movement of the cradle, and an adjustable stop for arresting the check arm at a predetermined point.

In witness whereof, I have hereunto subscribed my name.

WILLIAM A. NORMAN.

Copies of this patent may be obtained for five cents each, by addressing the "Commissioner of Patents, Washington, D. C."